(12) United States Patent
Bieck et al.

(10) Patent No.: US 6,695,271 B2
(45) Date of Patent: Feb. 24, 2004

(54) HOLDER FOR A BEVERAGE CONTAINER

(75) Inventors: Torsten Bieck, Waldachtal (DE);
Gunter Leopold, Baiersbronn (DE);
Juergen Koerber, Sindelfingen (DE);
Bernhard Duerr, Calw-Stammheim (DE); Frank Emhardt, Stuttgart (DE);
Hermann Gaus, Stuttgart (DE);
Thomas Geisel, Rottenburg (DE);
Christoph Jung, Altengstett (DE);
Rainer Leucht, Stuttgart (DE);
Ralf-Henning Schrom, Rottenburg (DE); Rainer Tiefenbacher,
Steinenbronn (DE)

(73) Assignee: Fischer Automotive Systems GmbH, Horb (DE)

( * ) Notice: Subject to any disclaimer, the term of this patent is extended or adjusted under 35 U.S.C. 154(b) by 0 days.

(21) Appl. No.: 10/253,266

(22) Filed: Sep. 24, 2002

(65) Prior Publication Data

US 2003/0062459 A1 Apr. 3, 2003

(30) Foreign Application Priority Data

Sep. 28, 2001 (DE) .......................................... 101 48 189

(51) Int. Cl.⁷ ................................................. A47K 1/08
(52) U.S. Cl. ..................... 248/311.2; 224/926; 297/194
(58) Field of Search .............................. 248/311.2, 310; 224/926, 281, 282, 275; 297/194

(56) References Cited

U.S. PATENT DOCUMENTS

| 3,606,112 | A | * | 9/1971 | Cheshier ...................... 224/554 |
| 5,297,767 | A | | 3/1994 | Miller et al. ............. 248/311.2 |
| 5,673,891 | A | * | 10/1997 | Fujihara et al. .......... 248/311.2 |
| 5,876,007 | A | * | 3/1999 | Lancaster et al. ........ 248/311.2 |
| 6,450,468 | B1 | * | 9/2002 | Hamamoto .............. 248/311.2 |

FOREIGN PATENT DOCUMENTS

JP       07329626 A        12/1995

* cited by examiner

*Primary Examiner*—Ramon O. Ramirez
(74) *Attorney, Agent, or Firm*—Michael J. Striker

(57) ABSTRACT

A holder (10) for a beverage container, which is provided in the construction of a motor vehicle, is formed with two extensions (14, 16), which are displaceable from a base position in a housing (12) into a use position extended away from the housing (12). One of the two extensions (14) has a champagne glass holder (28), on which a champagne glass is held in a stabile manner with its foot by means of downwardly pivoting holding-down devices (36).

1 Claim, 4 Drawing Sheets

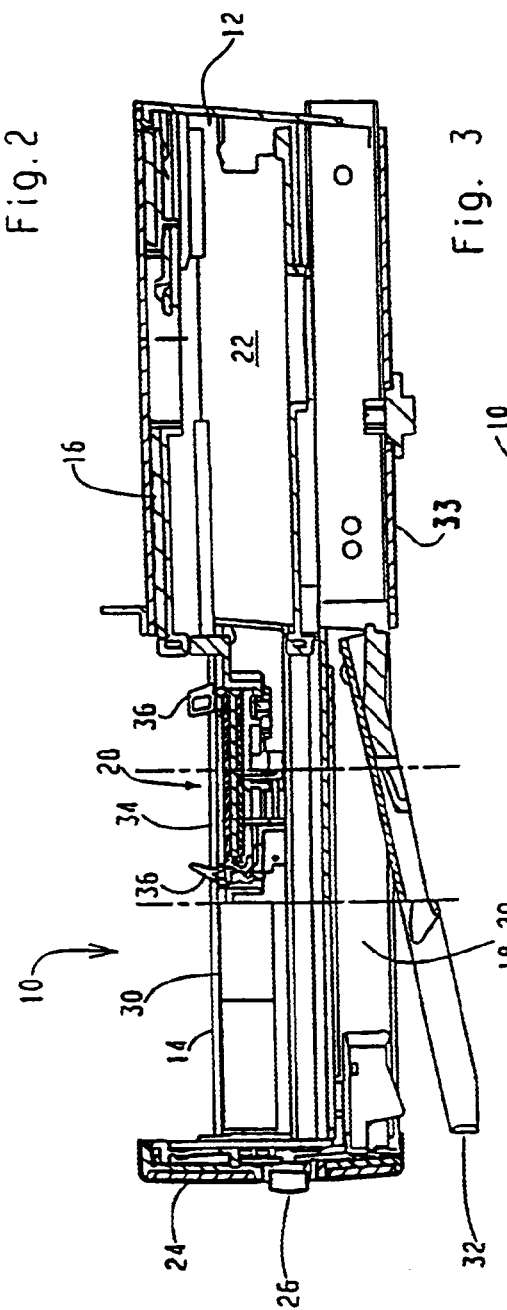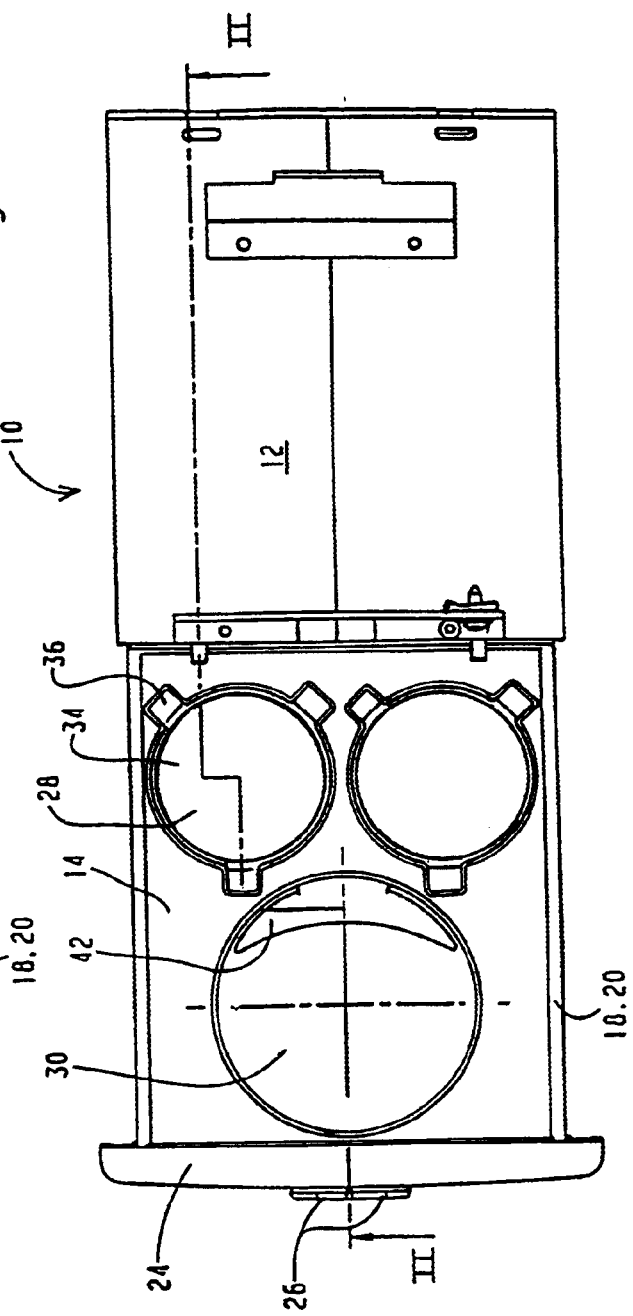

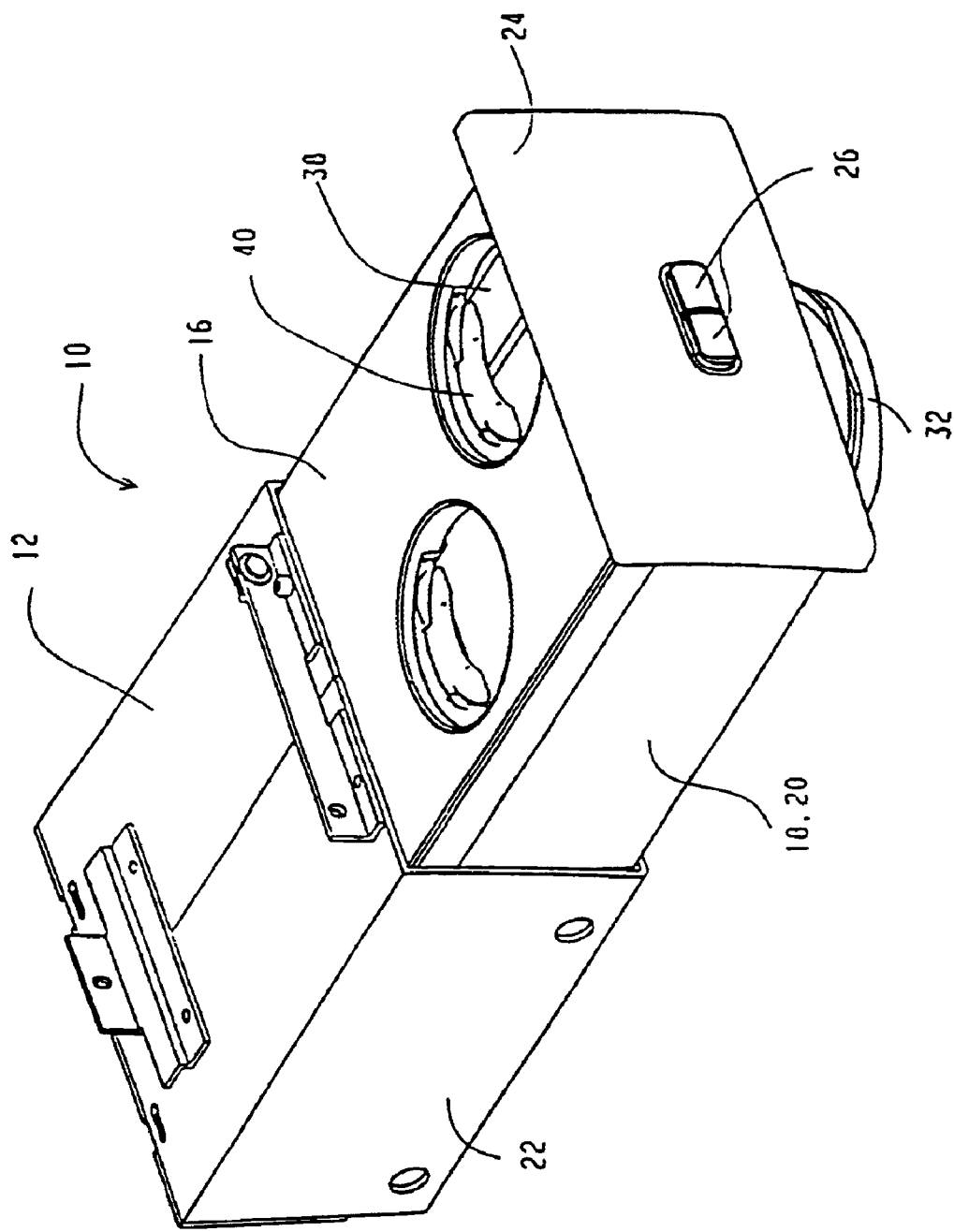

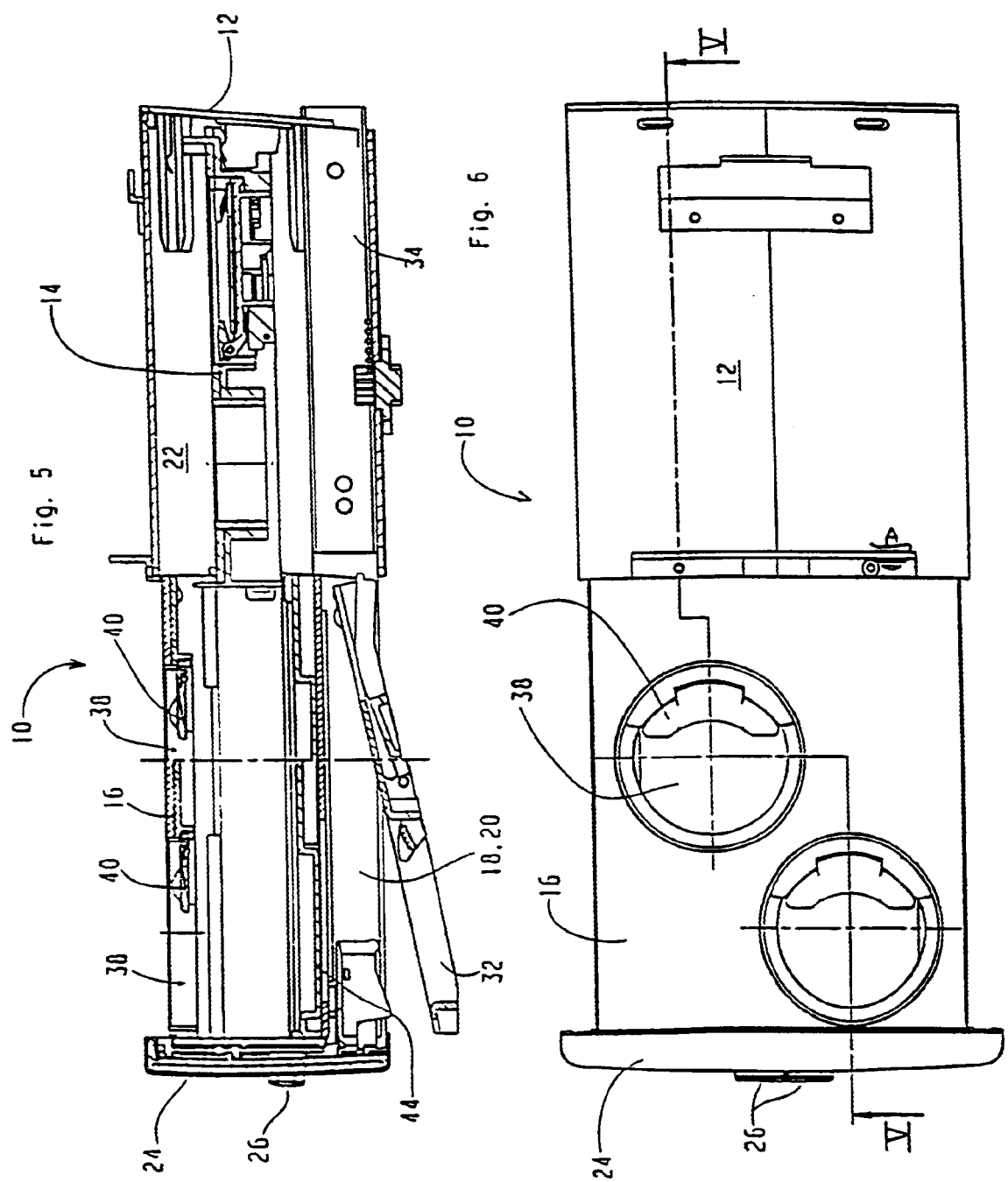

HOLDER FOR A BEVERAGE CONTAINER

BACKGROUND OF THE INVENTION

The present invention generally relates to a holder for a beverage container.

These types of holders are generally known. Typically, these holders are provided in construction in a motor vehicle or a means of travel. Holders with an extension are known, which are movably guided out of a displaced base position into an extended use position and back into the base position. In the base position, the extension, for example, is lowered into a housing, which connects in a common manner with a dashboard or the like of a motor vehicle. In the extended use position, the extension extends into a passenger chamber and is thereby accessible. The extension of the known holder commonly has one or more placement openings for placement of a beverage container, such as, for example, a beverage can or a cup.

The present invention is based on resolving the problem of creating this type of holder for additional possible uses.

SUMMARY OF THE INVENTION

This problem is resolved by the holder of the present invention, which has two extensions, which are adjustable selectively from a displaced base position in a housing into a use position extended out of the housing. At least one of the extensions is formed as a holder for a beverage container, while the other extension can have composition elements for a different use purpose. The invention makes possible, therefore, the space-saving use of the space either for two different holder types for different beverage containers or for a beverage container in combination with another use possibility.

For moving from the base into the use position and back again, the extension can have a swiveling or pivoting bearing, with which it is pivotally moveable about 90°, for example, from the base position into the use position and back again. A form of the invention contemplates a slide guide for the extensions, with which the extension is adjustably driven in a drawer-like manner into the extended use position and back into the base position.

A particularly advantageous combination is provided in a further form of the invention, in which the additional extension of the holder has a champagne glass holder. In this manner, a stabile holder possibility for a champagne glass is achieved, which based on the shape of champagne glasses, is not possible with typical holders, which commonly have a cylindrical recess as the placement opening for placing a beverage container. The extension of the inventive holder can have two or more champagne glass holders.

The champagne glass holder of the inventive holder, in one embodiment of the present invention, has a vertically movable positioning element in the extension, on which the champagne glass is positioned with its typically circular-disk shaped foot. The positioning element, for example, can have the shape of a circular disk. In addition, the champagne glass holder has at least one device for holding down the glass, which is movable from a released position into a holding position and from the holding position back into the released position. In the holding position, the holding-down element engages over the foot of the champagne glass position on the positioning element and holds the champagne glass stationary on the positioning element. The champagne glass is held stabile. In the released position, the champagne glass is removable. Preferably, the holder has two, oppositely disposed holding-down devices or three or more holding-down devices spaced from one another in the circumferential direction, and thereby, the champagne glass is held stabile. Between the vertical moveable positioning element and the holding-down device, a mechanical operating connection, for example, exists; that is, the positioning element forms a drive for the holding-down device and moves the holding-down device downwardly under movement of the positioning element into the holding position. Therefore, it is possible to position the champagne glass with its foot on the positioning element and to press the positioning element downward with the champagne glass. By means of downwardly pressing the positioning element, the holding-down element is moved into the holding position, in which the holding-down element engages over the foot of the champagne glass and holds on the positioning element, so that the champagne glass is held stable without tipping. This form of the invention makes possible a simple lifting by hand of the champagne glass holder. The champagne glass is held in a stabile manner through placement on the positioning element and counter pressure without further manipulation.

A further embodiment of the present invention contemplates a placement opening for a champagne bottle in the extension, as well as a support for the champagne bottle, which pivots downwardly upon extending the extension from the base position into the use position. The support that pivots downwardly upon extending the extension enlarges a support height, in which a champagne bottle positioned in the placement openings is supported, in order to hold the champagne bottle in a stabile manner in the placement opening. Through the form of the extension with two champagne glass holders, for example, and a placement opening for the champagne bottle, the inventive holder is suited for holding an open champagne bottle as well as two champagne glasses.

BRIEF DESCRIPTION OF THE DRAWINGS

The invention will be explained further with reference to the accompanying drawings:

FIG. 2 shows the holder of FIG. 1 in a multiply angled longitudinal section along Lines II—II in FIG. 3;

FIG. 3 shows the holder from FIG. 1 in a plan view;

FIG. 4 shows the holder of FIG. 1 with a second extension in a use position in a perspective representation;

FIG. 5 shows the holder of FIG. 4 in a multiply angled longitudinal section along lines V—V in FIG. 6; and FIG. 6 shows the holder of FIG. 4 in a plan view.

DETAILED DESCRIPTION OF THE PREFERRED EMBODIMENTS

Figure 1:
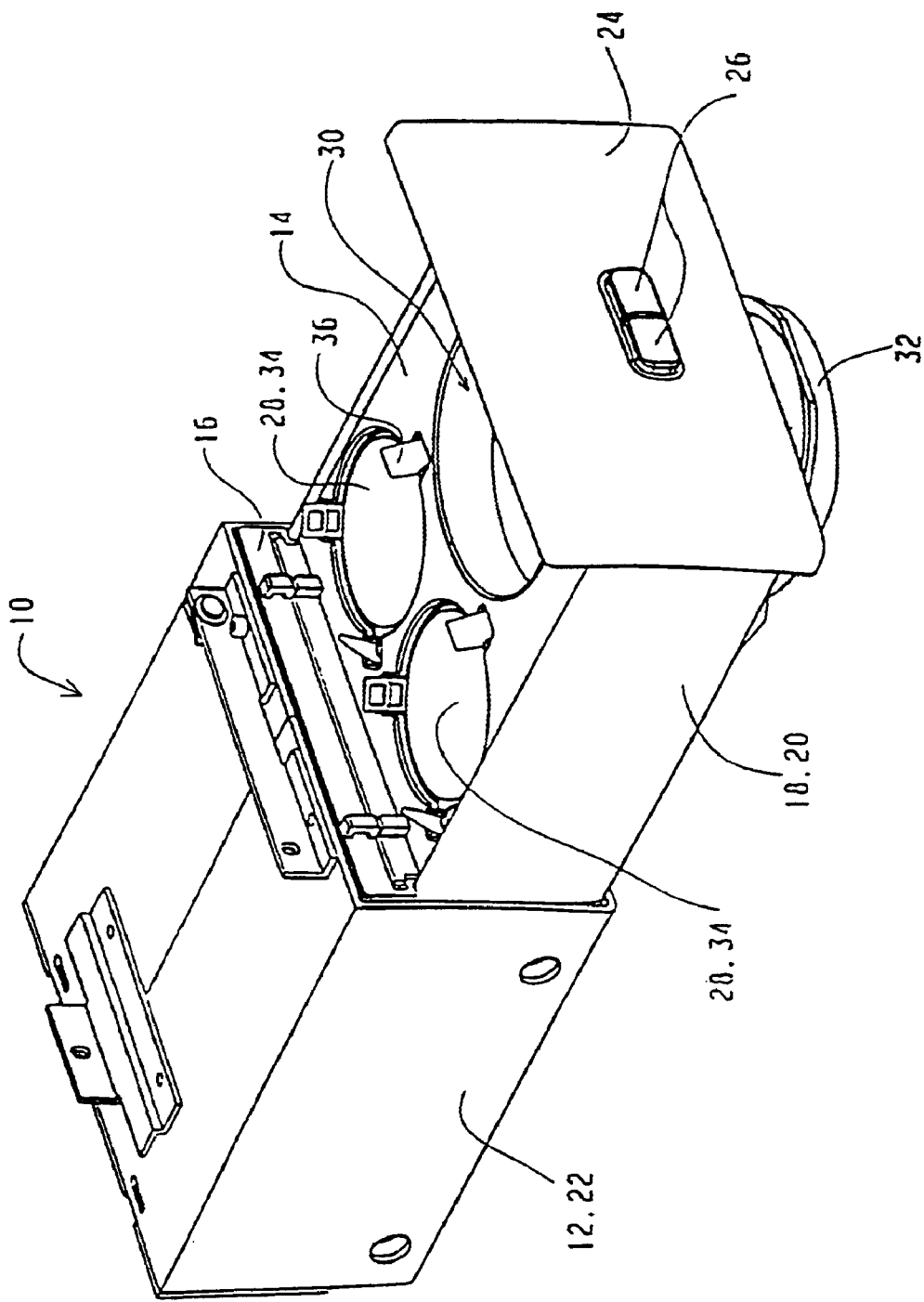
FIG. 1 shows the holder of the present invention with a first extension in a use position in a perspective representation.

The inventive holder 10 shown in the drawings is provided in the construction in a motor vehicle or another means of travel. The holder 10 has a cast-shaped housing 12 opened at a front side. In an upper area of the housing 12, two selectively, useable plate-shaped extensions 14, 16 are disposed over one another. The extensions 14, 16 are found, for example, on an upper side of a slider 18, which is formed in the manner of a drawer, however, without a bottom. The slider 18 has longitudinal side walls 20, which are driven displaceably in the manner of a drawer to an inner side of side walls 22 of the housing 12. On a front side, the longitudinal side walls 20 are connected to one another by a shutter 24. With the housing, the slider 18 forms a sliding guide for the two extensions 14, 16. This allows one of the two extensions 14, 16, together with the slider 18, to be displaced selectively into a use position extended away from the opened front side of the housing 12. The use position of the extension 14 represented in FIGS. 1–3 and the use position of the other extension 16 is shown in FIGS. 4–6. With non-use, the slider 18 along with the two extensions 14, 16 are displaced into base position within the housing 12, in which the shutter 24 closes the open front side of the housing 12.

The slider 18 is locked in its base position in the housing 12 and is unlocked by pressure onto one of two buttons 26 in the shutter 24, and extends out in a spring operated fashion into the use position. Depending on the selected button 26, one of the two extensions 14, 16 is chosen and extends with the slider 18 into the use position, while the unselected extension 14, 16 remains in its base position in the housing 12. In the base position of the slider 18, both extensions 14, 16 are locked on the slider 18, whereby the locking action is released by pressing on the button 26 respectively associated with one of the two extensions 14, 16. Suitable locking devices are known to the practitioner and will not be further described here, since these locking devices do not form a part of the present invention.

The extension 14 shown in its use position in FIGS. 1–3 has two champagne glass holders 28, as well as a circular placement opening 30 for a champagne bottle. On a lower side of the slider 18, a support 32 is arranged, which is pivotable about a horizontal axis. The support 32 pivots to project downwardly upon extension of the slider 18, a champagne bottle positioned in the placement opening 31 standing on the support 32. Upon insertion of the slider 18 into the housing 12, the support 32 glides over a bottom 33 of the housing 12 and is pressed thereby upwardly into a horizontal position in the slider 18.

The two champagne glass holders 28, respectively, have a vertical moveable positioning element 34 in the extension 14, which has the shape of a circular disk. A non-represented champagne glass is positional with its typically circular-disk shaped foot onto the positioning element 34, and the positioning element 34 is pressable downwardly into a lowered position with the champagne glass. With the downward movement, the positioning element 34 pivots three holding-down devices arranged about the circumference of the champagne glass holder 28 spaced from one another from an upwardly projecting released position shown in FIGS. 1–3 downwardly into a horizontal, inwardly standing holding position (not shown). In the holding position, the holding down devices 36 engage over the foot of the champagne glass in the positioning element 34 and holds the champagne glass in a tip-safe manner. By lifting up of the champagne glass, the foot of the champagne glass pivots the holding-down devices upwardly into the released positioned and the glass can be removed. With the holding-down devices 36, the positioning element 34 moves upwardly into its original starting position. The positioning element 34 is held in its upper and lower positions by means of known snap-spring elements, which are not visible in the drawings. After overcoming an intermediate position, the snap-spring element snaps the positioning element 34 into the respective end position upwardly or downwardly. The snap-spring element runs in the diametrical direction under the positioning element 34.

The extension 16 shown in the use position in FIGS. 4–6 has two circular placement openings 38 for placement of a beverage container, such as, for example, cans or cups. These placement openings 38 have smaller diameters than the placement opening 30 for the champagne bottle. All three placement openings 30, 38 have, respectively, a diameter adjustment shutter or flap 40, 42, which operates in a spring-operated manner to pivot about a horizontal axis into the placement position 30, 38. These types of diameter adjustment flaps are known in the art.

With the extension 16 with two placement openings for beverage containers, a floor or bottom 44 arranged in a lower region of the slider 18 extends out, on which beverage containers positioned in the placement openings stand.

It will be understood that each of the elements described above, or two or more together, may also find a useful application in other types of constructions differing from the types described above.

While the invention has been illustrated and described herein as a holder for beverage containers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Holder for a beverage container, comprising:
a first extension (16) having a placement opening (38) for the beverage container, wherein said extension (16) is moveable back and forth in a guide between a base position and an extended, use position, wherein the holder (10) has a second extension (14), wherein said second extension (14) is selectively extendable from a base position into a use position instead of said first extension (16), wherein the second extension (14) has a champagne glass holder, wherein the champagne glass holder (28) has a vertically moveable positioning element (34) onto which the champagne glass is positionable, wherein the champagne glass holder (28) has at least one holding-down device (36), wherein said at least one holding-down device (36) is movable from a released position into a holding position and from the holding position back into the released position, and wherein the positioning element (34) has an operating connection with the at least one holding-down device (36), wherein the positioning element (34) moves the at least one holding-down device (36) into the holding position upon a downward movement of the positioning element (34) by means of said operating connection, and wherein said at least one holding-down device engages over a foot of the champagne glass on the positioning element (34) when in the holding position.

* * * * *